United States Patent [19]

Gonzalez Oliver et al.

[11] Patent Number: 4,713,338
[45] Date of Patent: Dec. 15, 1987

[54] POROUS SPHERICAL GLASS FILTRATING BEADS AND METHOD FOR THE MANUFACTURING THEREOF

[75] Inventors: Carlos J. R. Gonzalez Oliver, Geneva; Olivier De Pous, Chene-Bougeries; Michel Schneider, Troinex, all of Switzerland

[73] Assignee: Battelle Memorial Institute, Geneva, Switzerland

[21] Appl. No.: 893,922

[22] Filed: Aug. 6, 1986

[30] Foreign Application Priority Data

Aug. 12, 1985 [EP] European Pat. Off. ........ 85810368.2

[51] Int. Cl.$^4$ ...................... C12N 11/14; C03C 11/00
[52] U.S. Cl. ................................... 435/176; 435/814; 435/815; 210/679; 501/33; 501/34
[58] Field of Search ............... 501/33, 122, 127, 128, 501/39; 435/176, 814, 815; 530/351; 436/528; 210/679

[56] References Cited

U.S. PATENT DOCUMENTS 4,168,261 9/1979 Edy ..................................... 530/351
4,279,654 7/1981 Yajimu et al. .................. 501/122 X

FOREIGN PATENT DOCUMENTS 839769 6/1960 United Kingdom ................. 501/39

*Primary Examiner*—Ferris H. Lander
*Attorney, Agent, or Firm*—Cushman, Darby & Cushman

[57] ABSTRACT

Porous glass beads for filtration applications having a homogeneous metaloxane structure and comprising oxides of Si, Zr and optionally Ti and Al. A preferred method for making these beads comprises the steps of (a) providing a mother solution of Si and Zr alkoxides in a water soluble solvent, for instance a lower aliphatic alcohol, (b) providing a liquid dispersant phase in which solution (a) is dispersible and stirring this liquid phase sufficiently to cause (a) to be formed into droplets of substantially uniform size when added to (b), (c) adding (a) to (b) at a rate sufficient to provide said droplets and effecting the hydrolysis of the alkoxides contained therein with consecutive gelation of said droplets into corresponding hardened beads of condensed mixed Si and Zr hydroxides, and (d) separating said beads from the liquid phase and drying to achieve the desired porous mixed oxide structure for the beads.

21 Claims, No Drawings

POROUS SPHERICAL GLASS FILTRATING BEADS AND METHOD FOR THE MANUFACTURING THEREOF

The present invention concerns porous glass mineral filtrating beads containing oxides of at least Si and Zr, said beads being usable for filtration in general, chromatographic separation in general and especially in gel adsorption and permeation chromatography. These beads are in the form of spheres of preferably substantially uniform size and porosity, these parameters being controllable by adjusting the operative parameters of the method of preparation thereof.

It is well known that current organic porous filtrating materials usable in gel adsorption and permeation chromatography, for instance crosslinked dextrans (SEPHADEX), polyacrylamides, agarose, polyhydroxyacrylates, polystyrenes and others cannot withstand relatively high filtration pressures because they tend to swell or shrink with consequent deterioration of the permeability parameters and loss of filtration efficiency (channelling).

Now, for efficient chromatography separation as well as for the selective adsorption of biochemicals (enzymes, cells, hormones, lectins and others) low deformation materials are needed, preferably of spherical shape to ensure homogeneous distribution and advantageously regenerable by thermal treatments.

Consequently, mineral beads have been developped for this purpose, mainly silica beads with relatively well controlled size and porous structure. Such materials are, for instance, the filtering aids named in the trade as LICHROSORB (MERCK); TDK-Gel (TOYO SODA); SPHEROSIL (RHONEPOULENC) and Controlled pore Glass (CPG by CORNING). These materials are generally manufactured by gelling-dispersive techniques starting from waterglass or colloidal silica sols or by fusion of silicate batches. Methods also exist based on the prepolymerization of Silicon alcoxides into liquid oligomers, pulverization or dispersion of said oligomers into droplets of controllable size and hardening of said droplets by hydrolytic gelation into porous $SiO_2$ beads. References on these methods are for instance: R. ENDELE et al., J. of Chromatography 99 (1974), 377–393; U.S. Pat. No. 3,667,909 (THOMAS); KOHLSCHUTTER et al., Kolloid Zeitsch. & Zeitsch. fuer Polymere 243 (1971), 148–152.

Although beads of porous silica presently on the market have merits, they are costly, sometimes lack homogeneity in shape (spherical), size and porosity and they are not stable in alkali (pH>10). Therefore attempts have been made to provide porous composite minerals having improved stability in basic media. For instance, No. DE-A-2.317.455 discloses powders for packing chromatography columns consisting of porous microspheres (1–10 u) with a thermally stable metal oxide such as $Al_2O_3$, $ZrO_2$, $TiO_2$, $Fe_2O_3$ or $SnO_2$ on the surface. No. DE-A-2.411.846 discloses the existence of $Al_2O_3$ microspheres obtained by agglomeration and firing of alumina particles resulting from the spray-dehydration of acidified aluminate solutions.

On the other hand, porous $SiO_2$ or mixed metal oxides are well known which can be prepared by the technique so called "sol-gel hydrolysis" which involves control-hydrolysing metal alkoxides into corresponding hydroxylated compounds and subsequent self-condensation to metaloxane structures by dehydration and heat. For instance, No. JP-A-58-194.748 (SUWA SEIKOSHA) discloses the hydrolysis of metal alkoxy compounds by the sol-gel process and the conversion of the gelled products by heat into microporous structures suitable for use as carrier for enzymes and other living materials. Other references in the field of porous glass for various purposes including filtration media and the manufacturing of optical glass are: Nos. JP-A-58-208.144; 58-213.655; 58-199.734; 58-199.733; 58-194.749 (all to SUWA SEIKOSHA); No. JP-A-56-169.121 (HITACHI); No. JP-A-57-190.645 (TOYOBO); No. JP-A-57-191.220 (HITACHI); H. MURAYAMA et al., Shikizai Kyokaishi 1973, 46 (7), 439–44; B. E. YOLDAS, J. Am Ceram. Soc. 1982, 65 (8), 387–93; Ultrastruct. Process. Ceram., Glasses Compos. (Proc. Int. Conf.) 1983, 60–69, D. R. WILEY, New York; E. YASUDA et al., Sci. Sintering 1978, 10 (2), 97–102; M. A. VICARINI et al., Bull. Soc. Chem. Fr. 1970, (10), 3884–7.

Further documents uncovered by the Official Search are listed hereunder:

No. EP-A-65863 (1) discloses a method of producing ceramic-forming metal hydroxide and oxide powders with variable and predeterminable sintering and densifying characteristics by hydrolyzing several samples of metal alkoxides using different amounts of water, calcining and sintering said hydrolyzed samples to produce samples of said metal oxide powder, and measuring the density of said samples to said metal oxide to obtain the relationship between said density and the water-alkoxide ratio. Then, by selecting the sintered density desired, hydrolyzing said alkoxide with the amount of water which corresponds to said desired sintered density to form said metal hydroxide, and drying said metal hydroxide it is possible to form said desired metal hydroxide powder; if an oxide powder is desired, heating said metal hydroxide powder to form said metal oxide powder can then be performed.

No. WO-A-83 03823 (2) discloses a method for preparing a ceramic material comprising a metal oxide, said method comprising ball milling a metal oxide powder and sintering said metal oxide powder. The latter is obtained by hydrolyzing at least one alkoxide to form a slurry, drying the metal oxide powder in said slurry, granulating and calcining, and conducting said ball milling within a determined pH range that maximizes dispersion of metal oxide powder within the slurry.

KOLLOID ZEITSCHRIFT & ZEITSCHRIFT FUER POLYMERE 243 (1971), 148–152 (3) discloses a method for making porous beads from silica. According to this method, a mother solution is prepared from silica ethoxide, diluted N/100 hydrochloric acid and alcohol; then after a preliminary hydrolysis has taken place, the solution is heated to 120° to drive off volatiles and there is obtained a solution (of oligomers) in which 1.4 ethoxy groups per Si atom have been split. This solution is stable and reproducible. It was converted, immediately afterwards, into beads by adding it under violet stirring to an ethanol-water solution activated with N/10 HCl. After agitating several hours at 70° C., the beads were boiled with diluted HCl, thoroughly washed with water, predried in air and finally dried at 120° C. Depending on preparation parameters a full range of beads of size from 10 μm to 1 mm were obtained. Typical bead properties (very briefly summarized) were: distribution of preferred size in classified fraction: 90%; structure density: 2.04 g/ml; porosity 0,373; specific area 682 m$^2$/g (BET); volume of pores: 0.29 ml/g; average pore diameter 20 A; etc . . . .

U.S. Pat. No. 3,922,333 (4) discloses the preparation of mullite powder by boiling a mixture of aluminium and silicon isopropoxides in isopropanol in the presence of ammonium hydroxide. The powder can be thereafter sintered by hot pressing into objects of near theoretical density usable as catalyst bases.

U.S. Pat. No. 3,887,692 (5) discloses the preparation of spheroids of aluminium halo-hydroxides as an antiperspirant component. One useful dispersion technique, i.e. the discharging of very fine droplets of a basic aluminum halide solution into the vortex of an insolubilisation dispersant medium is detailed in this reference.

Although some of the above references provide porous glass structures suitable in some cases for making filtration, they did not disclose regular spherical beads of substantially uniform size and controlled pore size and distribution. The beads of the present invention, as defined in claim 1, enable to fill this gap.

For making the beads of the invention, there is first provided a mother solution containing silicon alkoxides, zirconium alcoxide and, optionally, other metal alkoxides in the presence of a water-soluble solvent, e.g. alcohol, water and, possibly, an amount of acid or basic catalyst. The mother solution is formed into microdroplets by any conventional means, e.g. pulverization, spraying, atomization or dispersion after which the droplets are contacted with a hydrolyzing and gelling solution whereby they are converted into porous metaloxane homogeneous microsphere by hydrolysis and self-condensation according to the principle of the sol-gel techniques.

A particularly suitable method for making the beads of the invention involves the following steps: a solution of silicon alkoxide, preferably silicon tetraethoxide is first made containing one or more lower alcohols (for instance ethanol, isopropanol, amyl alcohol, butanol and others), zirconium alkoxide and a basic or acid catalyst such as ammonia or an organic amine or HCl or another mineral acid. Then the solution is converted to microdroplets, for instance by atomization or by adding it dropwise to a gelling aqueous solution stirred sufficiently to provide a homogeneous dispersion of microspheres of a few microns to several hundreds of microns. Depending on the case, such amine catalyst can be added to the solution of metal alkoxides and/or to the gelling solution. The stirring is carried out a time sufficient to enable the microspheres to hydrolyze and the alkoxides contained therein to harden by gellation and self-condensation to provide a spherical structure sufficiently rigid to be manipulated without collapsing. Then the beads are isolated by usual means, decanting, filtration, centrifugation, solvent exchange and subsequent rotoevaporation under partial vacuum, etc.. and they are dried and heat treated to ensure full hardening of the structure.

The alkoxides solution need not be limited to silicon and zirconium but other metal alkoxides or organic chelates can be added (such as for instance titanium and aluminum alkoxides or aluminium complex acetylacetates or acetylacetonates) so as to obtain further composite metaloxane structures. It is indeed known that composite metal oxides including silica and other refractory oxides such as $Al_2O_3$, zirconia and titania provide better resistance to alkali than pure $SiO_2$. Therefore, in the present invention, composite metaloxane beads containing oxides of Si, Zr, Al and Ti have been made and shown to be particularly resistant to strong alkaline solutions. The term "homogeneous metaloxane structure" used here refers to polymeric metal-oxygene network structures in which the various metals are homogeneously distributed on the molecular scale, this being in contrast with prior art structure which rather involve mixtures of metal oxides on the agglomerate scale of several Angstroem or more. This is an extremely valuable characteristic for the filtration of high pH solutions.

The aqueous medium in which the alkoxide solution (called gelling solution) is added dropwise under dispersing conditions can be water or an acidic or basic aqueous solution. The rate of gellation of the dispersed beads will naturally depend on the concentration of the acid or basic catalysts in the gelling solution and also on the amount of acid or base in the dispersing solution. Too much catalyst will provide rates that may be too fast to ensure nice homogeneous sphere formation but too little catalyst may be insufficient to provide positive hardening and the formation of a self-sustaining structure; therefore the correct amount of catalyst is between these two extremes and shall be selected by practitioners according to their needs; actually using a total of about 0.01 to 1 mole of catalyst per total molar amount of alkoxide is suitable in the present invention. The preferred catalysts are HCl or ammonia or triethanolamine. When acid is used as a catalyst, diluted HCl is preferred. Organic amines should be water soluble and include, for instance, triethylamine, pyridine, pyride, morpholine, and other like aliphatic and heterocyclic amines. In addition, by varying the catalyst concentrations, the total pore volume and structure can be accordingly altered. For instance, using ammonia as the catalyst, in general, the pore size increases with the catalyst concentration.

The dispersion phase is preferably agitated under rotation such as to provide a liquid vortex sloping down toward the center of the container; for achieving this, vertical blade stirrers or propeller stirrers are adequate, rotations of about 200 to 1000 rpm being convenient; when adding the organic gelling solution dropwise to the dispersant solution, the former is preferably dispersed by gravity or by spraying (by means of a nozzle) so that the delivered liquid hits the sloping edges of the dispersing phase under rotation.

The gelling liquids described above are not very stable per se and, consequently, they must be subjected to dispersion in the aqueous phase quite readily after their preparation. Other types of alkoxide solution (precursor liquids) also usable as mother-solutions are quite stable on storage and can be prepared by allowing the prepared alkoxide solutions to undergo partial self-oligomerization and stabilization before use. In order to achieve such prepolymerization, a small amount of water is added together with a catalyst (the catalysts are still the same as disclosed before, preferably mineral acids) and a prehydrolysis of the alkoxides is allowed to proceed for a limited period. It is important to note that, practically, the silicon alkoxide alone should be allowed to prehydrolyze first before adding the remaining alkoxides of the other metals. Thus, a solution is first prepared containing the silicon alkoxide, a solvent, an amount of water and the catalyst; then it is heated for prehydrolyzing the silicon compound and, thereafter, after cooling, the other alkoxides of Zr, and optionally Al and Ti are added and also prehydrolyzed. Thereafter, stabilization is effected by eliminating the water, excess of catalyst and volatile by-products and solvents by evaporation at temperatures of the order of 60° to 150° C. under ambient pressure or under reduced pressure. During this elimination of the volatile components of the mixture, the viscosity (measured at room temperature) significantly rises and the oligomerized "metaloxane-alkoxide" solution becomes remarkably storage stable (several weeks to several months for solution having viscosities of the order of 5 to 50 cSt). Nevertheless, such storage stable solutions can be used any time for the dispersion into droplets stage with equally excellent results; however, in general, the concentration of the alkali catalysts in the water dispersive phase is preferably increased with such precursor solutions as compared to the cases when using the gelling solutions; the use of about 10 to 100% molar quantities of concentrated ammonia relative to the alkoxides to be hydrolyzed (to be added to the water phase after the dispersing therein of the precusor solution) is preferred.

To enable closer control of the bead size and the bead porosity (volume and size of pores per weight of beads), water insoluble solvents can be added to the precursor solution before dispersion; solvents such as petroleum ether or cyclohexane are convenient, the proportions thereof, relative to the precursor solution being about 1:20 to 1:5 by weight. The function of such water insoluble solvents is presumably to aid in droplet shaping and separation from the aqueous phase and to control the leaching from the droplets of hydrosoluble solvents (alcohols) by the water phase, the formation and size of pores depending on the rate of leaking of such water soluble solvents from the droplets before or in the course of their hardening into beads. Furthermore, different prehydrolysis and selfoligomerization conditions furnish differently stable precursors and, in turn, different porosities.

In order to complete the hardening of the separated and dried beads, thermal treatments, for instance heating from about 400° to 1200° in air for about 1 hour to 5 hours or in an inert gas, can be applied. In performing such treatment, the temperature should preferably be raised carefully to avoid bead breaking (internal pressure effects); in general temperature rises of about 1° to 10° C./min are convenient. It should be noted at this stage that the aforementioned technique is apparently similar to that disclosed by KOHLSCHUETTER et al., (Kolloid Zeitschr. & Zeitschr. fuer Polymere 243 (1971), 148–152) with reference to the preparation of porous silica beads. However, this author only uses water-alcohol gelling solutions and HCl as gelation catalyst. Furthermore, KOHLSCHUETTER does not disclose homogeneous metaloxane structures involving other metal oxides besides silica which strongly limits the capacity of the beads in use for affinity chromatography in high pH media as compared with the beads of the present invention.

Also the present technique involves much faster reactions than that reported by KOHLSCHUETTER, i.e. 6-8 hrs at 70° C. including the requirement that the beads must be strengthened by boiling in hydrochloric acid before separation from the reaction medium.

The beads resulting from the present process have good sphericity and a diameter which can be comprised between approximately 5 and 500 μm depending on the conditions. By appropriate sieving of the terminated beads, lots of substantially uniform sizes (i.e. ±20% the average diameter) can be obtained in yields often in the range of 80%. The achievable porosity is in the range of 100 to 600 m²/g and is controlable to some extent by (a) adjusting the operative conditions and the solution concentrations and (b) amplifying pore size by alkaline solution treatment. For this, the beads are preferably boiled in an aqueous or aquo-alcoholic solution of sodium hydroxide for a time sufficient to leach-out part of the material of the beads internal surface with consecutive enlargement of the pore size. Normally, pore size of 2 to 500 nm are achievable in this invention. Also the volume of the pores can be between 0.2 cm³/g and 4 cm³/g.

Furthermore, the external surface of the present beads is extremely smooth and the dry beads are exceptionally easily free flowing. For instance, if poured dry by gravity in a glass tube (for instance a tube with an internal diameter not exceeding about 10 times the beads diameter), they slide so freely one over each other that the volume they will occupy is practically the minimum possible volume theoretically attainable.

For using the beads for chromatographic separations, a solution of homogeneously dissolved species to be separated is poured over a column filled with the beads of the invention and then elution is brought about with solvents of progressively changing polarity. Naturally, provided that appropriate derivalization of the beads is effected, the latter are suitable for chromatography by ion exchange or ligand exchange, hydrophobic chromatography, reversed phase chromatography and others. The beads of the invention are also usable, when selected in the 5–10μ range or below and properly derivatized as usual in the field of HPLC (high performance liquid chromatography) and related techniques.

The following Examples illustrate the invention in further details.

EXAMPLE 1

A solution of silicon, zirconium, aluminum and titanium alkoxides (g 4-A) was prepared by mixing together the following partial solutions:
(i) 9 g of $Si(OEt)_4$ in 3.3 g of tert.amylalcohol (t.AmOH) and 0.65 g of a 1N HCl n-butanol (BuOH) solution.
(ii) 3.6 g of $Zr(OiPr)_4 \times 1.6$ iPrOH in 3.2 g of t.AmOH
(iii) 4.6 g of di-sec.BuAl acetoacetate (Al chelate) in 1.7 g of T.AmOH
(iv) 2.8 g of $Ti(OiPr)_4$ and 3 g of triethanolamine (TEA) in 2.5 g of t.AmOH.

Solution g 4-A was heated for 15 min at 60° C. (with condenser fitted on the flask) and, after cooling, it was diluted with 14.4 g of the following solution (v) containing b.w. BuOH 50% (7.2 g), EtOH 40% (5.76 g), $H_2O$ 10% (1.44 g). This solution was dispersed immediately into water at room temperature according to the following procedure:

In a 50 ml beaker, 20 ml of pure water was rotated with a vertical blade stirrer until it formed a well defined vortex tapering toward the center with sides sloping at an angle of approximately 30°–45° (about 300 rpm). The solution g 4-A (5, 10 or 20 ml depending on the run) was added dropwise, the drops falling vertically about to the middle of the slope of the rotating liquid. Nice little spheres formed immediately which gelled rapidly; after 15 min stirring, the beads were filtered out and dried in an oven (air drying) at 95° C. The size of the spheres was substantially uniform (about 100 μm) and the shape did not change significantly after heating to 850° C. in air. The oxide composition of the spheres corresponded to approximately (by weight %): 50 $SiO_2$, 20 $ZrO_2$, 15 $Al_2O_3$, 15 $TiO_2$. Efficient filtrating beads were achieved with these beads which withstood aqueous solutions with pH up to 13 without noticeable deterioration.

If in this Example the t.AmOH is replaced by n.BuOH the same results are observed, the obtained spheres being however slightly smaller.

EXAMPLE 2

In the manner of previous Example 1, a solution identical with g 4-A was prepared except for the addition of 28.5 g of EtOH and 35.7 g of N.BuOH instead of the quantities given previously; this solution was identified as g 4-20%.

The dispersion into water was done exactly as in the previous example (10 ml of g4-20% in 40 ml $H_2O$ agitated at 350 rpm) but after a few minutes, 10 ml of 0.1N aqueous $NH_4OH$ were further added. Nice solid spheres were obtained which, after drying, were stable up to 600° C. When ammonia was replaced by an equivalent solution of TEA, the same results were obtained. With more concentrated ammonia (1N or 2N) most of the spheres were destroyed.

The size of the spheres could be modified by adding 1-2% b.w. surfactants to the dispersing water. For instance, using polyoxyethylene-sorbitan monolaurate (TWEEN 20) or sodium dodecylsulfate (SDS) gave much smaller spheres (20-60 $\mu$m) than polyvinylalcohol (PVA) 1.5%; spheres 60-130 $\mu$m. Polyethylene glycol (PEG 400; 1%) gave 30-80 $\mu$m spheres.

Surface area of the beads was measured according to the known BET technique (see "Adsorption, surface area and porosity" Ed. by S. I. Gregg & K. S. W. Sing; 1982, Academic Press, N.Y.).

A MICROMERITICS Model 2200 high speed surface area analyzer was used. For determining pores sizes a CARLO ERBA Model AG/65 porosimeter was used according to usual means. For making the measurements, spheres with sizes in the 50 $\mu$m range were selected. The beads resulting from the compositions of the present example had a porosity of about 290 $m^2/g$ after heating for 4 hours at 140° C. This porosity was decreased to about 80-100 $m^2/g$ after 1.5 hours at 350° C. The beads of example 1 had a porosity of 200 $m^2/g$ after 0.5 hour at 550° C. All the pores were about 10 nm in size.

EXAMPLE 3

The following alkoxide solutions (G1, G2 and G3) were prepared using the procedure of Example 1, i.e. mixing first the four partial solutions detailed below and then finally adding the last one (5), the ingredients used being listed below:

| Ingredients | G1A | G1B | G2 | G3A | G3B |
|---|---|---|---|---|---|
| (1) t.AmOH | 20 | 20 | 20 | 12 | 12 |
| Si(OEt)$_4$ | 34.06 | 34.06 | 20.12 | 32.8 | 32.8 |
| $NH_4OH$ 1 N in BuOH | | 1.48 | — | | 1.46 |
| HCl 1 N in BuOH | 1.48 | | 1.2 | 1.46 | — |
| (2) t.AmOH | 4 | 4 | 8 | 1.6 | 1.6 |
| Zr(OiPr)$_4$ × 1.6 iPrOH | 5.94 | 5.94 | 19.88 | 1.9 | 1.9 |
| (3) t.AmOH | | | | 1.2 | 1.2 |
| Al chelate | | | | 3.3 | 3.3 |
| (4) t.AmOH | | | | 1.8 | 1.8 |
| Ti(OiPr)$_4$ | — | — | — | 1.98 | 1.98 |
| TEA | 6 | 6 | 20 | 2 | 2 |
| (5) $H_2O$ | 3.26 | 3.26 | 2.84 | 3.26 | 3.26 |
| EtOH | 54.0 | 54.0 | 47.0 | 60.2 | 60.2 |
| n-BuOH | 53.26 | 53.26 | 42.96 | 58.8 | 58.8 |
| Cyclohexane | 18.0 | 18.0 | 18.0 | 17.6 | 17.6 |

After dispersing these solution into water then adding $NH_4OH$ as in Example 2 to catalyse the hydrolysis of the droplets, spheres were obtained which were collected and dried as indicated in the previous Examples. Filtrating beads containing 85% $SiO_2$ and 15% $ZrO_2$ were obtained with solutions G1A and G1B; the beads from G2 analyzed 50% $SiO_2$ and 50% $ZrO_2$ and the beads from G3 were 85% $SiO_2$, 5% $ZrO_2$, 5% $Al_2O_3$ and 5% $TiO_2$. The beads from G3 were particularly stable and alkali resistant. The porosity was about 0.5 $g/cm^3$ and the pore sizes about 20 nm.

EXAMPLE 4

A solution (PG-1) containing silicon and zirconium alkoxides was prepared as follows: a mixture of 50 g (0.24 mole) of Si(OEt)$_4$, 13.63 g of ethanol, 4.32 g of $H_2O$ and 1.87 g (0.24 mmole) of a 1N HCl-ethanol solution was heated to 60° C. for 30 min; then it was cooled down to 12.5° C. and 8.73 g of the zirconium isopropoxide (see compound ii in Example 1) were added under dry conditions (glove-box). The mixture was stirred for 30 min and progressively heated. Volatiles started to distill off at about 82° C. and, when at 100° C., dry $N_2$ was bubbled to drive off more solvents. At 140°, the pressure was reduced to a few Torr for 5 min, then the mixture (31.5 g) was allowed to cool. The viscosity, measured at room temperature with an UBBEHOLDE viscometer, was 16.5 cSt.

Ten ml of this solution were mixed with 3 ml t.AmOH and 3 ml cyclohexane and added dropwise at room temperature to 100 ml of a rotated (750 rpm) water solution (see the technique described in Example 1) of 1% PEG-400. The PG-1 solution dispersed well in the water-surfactant solution and, after a few min, 6 ml of concentrated (25%) aqueous ammonia were added to catalyze the hydrolysis of the alkoxides. After 40 min agitation, 200 ml of technical alcohol (4% $H_2O$) were added and, after resting for some time (2-3 hours), the supernatant liquid was syphoned off and the remaining spheres were resuspended in 130 ml ethanol; the decanting was repeated and after adding a new 100 ml ethanol portion, the dispersion was transferred to a rotavapor apparatus and evaporated at 60°/10 Torr for 1-2 hours. A well dried lot (G1-1) of free-rolling little spheres about 200-400 $\mu$m was thus obtained.

EXAMPLE 5

Precursor alkoxide solutions (PG1-b; PG3-a; PG3-c; PG4-b) were prepared by mixing together the ingredients listed below (in g) and observing the same precautions indicated for PG1-a in the previous example, i.e. adding the reactive Zr, Al and Ti organic compounds under a dry protective atmosphere. Distillation of the excess volatile liquids was thereafter carried out like in Example 4 for PG1-a, until viscous and stable prehydrolyzed liquids were obtained which contained metal-oxane prepolymers. These solutions were storage stable and presented the advantage of being usable for making beads by dispersion in water at any desired time.

|  | PG1-b | PG3-a | PG3-c | PG4-b |
| --- | --- | --- | --- | --- |
| Si(OEt)4 | 500 (2.4 mole) | 400 | 500 | 250 |
| EtOH | 136.3 | 109 | 136.3 | 68.2 |
| HCl 0.1 N in EtOH | 18.7 | 14.96 | 18.7 | 9.4 |
| H2O | 38.9 | 34.56 | 43.2 | 21.6 |
| Zr(OiPr)4 | 87.27 | 23.26 | 29.8 | 98.9 |
| Ti(OiPr)4 | — | 19.37 | 24.2 | 61.8 |
| Al(chelate) | — | 40.22 | 50.3 | 128.3 |

Prior to dispersion into aqueous systems, the above viscous solutions were diluted with the solvents listed in the Table below in the proportions given in ml. Then the diluted solutions were subjected to dispersion into the systems and under the conditions also indicated in the following Table (units other than ml are indicated).

|  | PG1-b | PG1-b | PG3-a | PG3-c | PG4-b |
| --- | --- | --- | --- | --- | --- |
| dilution | 45 | 45 | 60 | 45 | 45 |
| t.AmOH | 22.5 | 22.5 | 40 | 22.5 | 22.5 |
| Cyclohexane | 7.5 | 7.5 | — | 7.5 | 7.5 |
| Dispersion |  |  |  |  |  |
| H2O | 668 | 668 | 495 | 668 | 668 |
| TWEEN 20 | — | — | — | 7.5 | 7.5 |
| PEG 400 | 7.5 | 7.5 | 5 | — | — |
| EtOH | 75 | 75 | — | 75 | 75 |
| Time (min) | 5 | 5 | 3 | 5 | 5 |
| rpm | 520 | 520 | 750 | 400 | 400 |
| NH4OH (25%) | 30 | 30 | 60 | 30 | 30 |
| bead size (u) | 100–170 | 100–250 | <100 | <170 | <120 |
| Sample identification | G1-5 | G1-6 | G3-1 | G3-6 | G4-2 |

Sample G4-2 had 40% of the beads in the range 100 to 170 $\mu$m and 60% in the range lower than 100 $\mu$m size. It is also noted that the addition of cyclohexane to the precursor solutions resulted in larger beads than without cyclohexane. The surface area of the beads were in the range 200–600 m$^2$/g and the estimated pore volume about 0.1 to 0.65 cm$^3$/g.

EXAMPLE 6

Chemical modification of porosity

Sample G1-1 of Example 4 (initial surface are close to 550 m$^2$/g) was first hardened at 220° in air, then it was degassed hot and cooled under vacuum to 20° C. and contacted (still under vacuum but slowly raising the pressure) with 70 ml of a 1:1 mixture of EtOH and 0.1N aqueous NaOH. The beads were refluxed for 30 min, washed twice with EtOH, once with acetone and dried as usual (rotavapor). Then they were heated for 1 hour at 550° fo 1 hour. The surface area had gone up to 768 m$^2$/g but many of the spheres were broken.

A sample of G3-1 (see Example 5; original porosity 526 m$^2$/g) was treated as sample G1-1 but with the following differences: it was subjected to two alkaline treatments, one after the first hardening at 220° C., and the second after heating to 500° C. (2 hours). It finally got a last heat treatment at 580° C. in air; the surface went up to 576 m$^2$/g but some of the beads were broken.

Similar attacking effects were experienced when the alkaline solution was replaced by a mixture of 5 ml pure HNO3 and 25 ml EtOH.

Electron micrographs of the spheres showed that the microstructure corresponds to a high packing density of very small spheres in contrast with control CPG beads (prior art) characterized by typical separated phase and leached structure (91 m$^2$/g); pore size 15.6 nm).

Samples of lots G1-5, G1-6, G3-6 and G4-2 were treated as sample G3-1 but under milder conditions to reduce bead breaking. The alkaline solution treatment was effected (with no prior degassing and no stirring) at 60° C. for 3 hours and took place a first time after hardening at 220° C. and a second time after a second hardening at 500° C. Then a final heat treatment at 580° C. was given. The results are shown below and indicate a reduction of effective surface area; this is due to pore enlargement and partial removal of internal pore roughness.

| Sample | Initial surface area (approximate) | Final surface area (after treatment at 580° C.) |
| --- | --- | --- |
| G1-5 | 500–550 | 429 |
| G1-6 | " | 434 |
| G3-6 | 525 | 512 |
| G4-2 | " | — |

The above-described bead samples were analyzed by Electron Dispersion Spectroscopy according to usual means. The results confirmed that the proportion of the various oxides in the samples are as follows:

|  | Oxide content in weight % | | | |
| --- | --- | --- | --- | --- |
|  | SiO2 | ZrO2 | Al2O3 | TiO2 |
| G1-5 | 85 | 15 |  |  |
| G3-6 | 85 | 5 | 5 | 5 |
| G4-2 | 50 | 20 | 15 | 15 |

EXAMPLE 7

Samples of lots G1-5, G1-6, G3-6 and G4-2 (heat treated at 580° C.) were subjected to 2 hours chemical stability tests under acid and alkaline reflux conditions.

The acid test conditions were as follows: 50 mg of beads boiled with a mixture of 15 ml aqueous HCl 1N, 15 ml aqueous HNO3 1N and 30 ml EtOH. For the alkaline test, a mixture of 35 ml aqueous 1N NaOH and 35 ml EtOH, pH 12.4 was used. After cooling, the beads were filtered out and the filtrate was analyzed for dissolved Si, Ti and Al. A sample of CPG-3000, a commercial filtration material was tested identically for comparison purposes. The results are summarized below:

| sample | specific area (m$^2$/g) | weight dissolved (mg) | | | Total fraction dissolved over specific area |
| --- | --- | --- | --- | --- | --- |
|  |  | SiO2 | TiO2 | Al2O3 |  |
| | | Acid test | | | |
| G1-5 | 429 | 4.62 | — | 0.17 | 2.23 |
| G1-6 | 434 | 3.47 | — | 0.06 | 1.63 |
| G3-6 | 512 | 3.08 | 2.20 | 1.13 | 2.50 |
| G4-2 | — | 0.92 | — | 0.06 | — |
| CPG-3000 | 7.8 | 0.77 | — | — | 19.74 |
| | | Basic test | | | |
| G1-5 | 429 | 22.66 | | | 12.4 |
| G1-6 | 434 | 19.62 | | | 9.0 |
| G3-6 | 512 | 6.74 | | | 2.6 |
| G4-2 | — | 7.04 | | | — |
| CPG-3000 | 7.8 | 49.12 | | | 1260 |

The above results show that the beads containing simultaneously Si, Zr, Ti and Al are much more stable than the control; for instance, in the alkali test, the control sample (CPG-3000) nearly dissolved completely.

EXAMPLE 8

Gel permeation chromatography columns (5 mm calibrated glass) of about 5 ml volume were loaded with the spheres disclosed in the previous example. For doing the filling, the spheres (washed with water) were suspended in water and, after decantation, the slurries were transferred to the columns and washed with the eluting phase until a UV recorder to which the bottom of the column was connected for spectrographically analyzing the eluate showed a constant base-line absorption (Spectrophotometer used: type UV-2 of PHARMACIA). The eluting phase was either distilled water or 0.15M phosphate buffered saline, (PBS) pH 7.4 containing 0.1% v/v sodium dodecyl sulfate (SDS). The substrates to be separated (phenol, human serum albumin (HSA) and Blue dextran) were injected at top of the column (0.1 ml of an approximately 1 g/l solution) and then eluted with the eluting phase. The eluate was analyzed spectrophotometrically as indicated.

The results are shown below in terms of volume of eluate (ml) in the successive fractions and, in brackets, the yield of the eluted substance. The controls were commercial CPG-10 $SiO_2$ (170A) beads and sephadex 675 (an organic porous medium).

| Bead sample | Eluent | Phenol | HSA | Blue dextran |
|---|---|---|---|---|
| G1-5 | $H_2O$ | 4.7 (100) | 2.9 (85) | — |
|  | PBS | 5.1 (87) | 2.85 (98) | 2.8 (100) |
| G1-6 | $H_2O$ | 5.3 (100) | 3.3 (98) | 2.95 (95) |
| G3-6 | $H_2O$ | 4.25 (98) | 2.8 (92) | 2.7 (100) |
| G4-2 | $H_2O$ | 2.55 (100) | 2.25 (100) | — |
| CPG-10 | $H_2O$ | 5.35 (89) | 3.5 (38.5) | 3.4 (100) |
|  | PBS | 5.35 (100) | 3.6 (99) | 3.25 (100) |
| Sephadex | $H_2O$ | 7.0 (100) | 2.9 (97) | 2.6 (100) |

The above results show that the beads of the invention have separating properties practically as good as sephadex and superior to that of commercial glass beads in the case of using water as the eluent.

The beads of the present invention can also be used for immobilizing enzymes so as to provide an enzymatically active mineral substrate usable for the catalysis of biological reactions. The binding of enzymes to the beads can be effected by usual means, i.e. a ligand having affinity for a specific enzyme to be bound. As such, alkoxysilanes carrying reactive groupings such as OH, SH, amino, isocyanato oxirane and the like are suitable as well as known in the art.

We claim:

1. Porous mineral or glass filtrating beads of substantially uniform spherical shape characterized in having a homogeneous metaloxane structure consisting essentially of silicon oxide and zirconium oxide and optionally at least another metal oxide selected from titanium and aluminium oxides.

2. The porous glass beads of claim 1 having a mean size in the range of 5 to 500 μm and a porosity in the range of 100 to 600 $m^2/g$.

3. The porous glass beads of claim 1 having pores enlarged by treatment with alkali in the size range of 2–500 nm and a pore volume of 0.2–4 $cm^3/g$.

4. The beads of claim 1, of which at least 80% is within ±20% of the average diameter size.

5. The beads of claim 1 whose surface smoothness is such that when poured by gravity dry into a tube whose diameter is not exceeding about 10 times the average bead diameter size, they slide so freely against each other that the space they will occupy corresponds practically to the minimum volume theoretically attainable.

6. A method for making the porous glass beads of claim 1 comprising the steps of
   (a) providing a mother solution of Si alkoxide and at least one other metal alkoxide of Zr, Ti and Al;
   (b) converting said mother solution into microdroplets by usual means, e.g. atomization or dispersion;
   (c) contacting said microdroplets with a gelling solution whereby the microdroplets will be converted by hydrolysis and self-condensation into porous microspherical beads with a homogeneous metaloxane structure; and
   (d) isolating said beads and drying.

7. The method of claim 6, comprising the steps of:
   (a) providing a mother solution of Si and Zr alkoxides in a water soluble solvent, for instance a lower aliphatic alcohol;
   (b) providing a liquid dispersant phase in which solution (a) is dispersible and stirring this liquid phase sufficiently to cause (a) to be formed into droplets of substantially uniform size when added to (b);
   (c) adding (a) to (b) at a rate sufficient to provide said droplets and effecting the hydrolysis of the alkoxides contained therein with consecutive gelation of said droplets into corresponding hardened beads of condensed mixed Si and Zr hydroxides, and
   (d) separating said beads from the liquid phase and drying to achieve the desired porous mixed oxide structure for the beads.

8. The method of claim 7, wherein the mother solution (a) further contains titanium and aluminum in the form of hydrolysable organic compounds, the resulting beads containing mixed oxides of Si, Zr, Ti and Al.

9. The method of claim 7, wherein the water soluble solvents in the mother solution (a) comprise ethanol, propanol, isopropanol, n-butanol, tert-butanol, iso-amyl alcohol and n-amylalcohol.

10. The method of claim 7, wherein the liquid phase dispersant is a neutral, acidic or alkaline water solution.

11. The method of claim 7, wherein the stirring of said dispersant liquid is effected so as to rotate said liquid and provide therein a vortex with edges sloping toward the center.

12. The method of claim 7, wherein the hydrolysis of step (c) is due to water penetrating into said droplets and hydrolyzing said alkoxides into corresponding hydroxides.

13. The method of claim 12, wherein said gelation of the material of the droplets is due to self-condensation of said metal hydroxides into corresponding metaloxane structures.

14. The method of claim 7, wherein said hydrolysis of the alkoxides is catalyzed by acids or bases incorporated in the mother solution (a) and/or the dispersant phase (b).

15. The method of claim 7, wherein the mother solution (a) is first subjected to prehydrolysis to convert the alkoxides into soluble oligomers before undertaking step (b).

16. The method of claim 15, wherein the prehydrolysis is effected by adding water and a catalyst to the mother solution (a) and thereafter distilling off the excess of this water, the result being a mother solution of increased viscosity and storage stability.

17. The method of claim 16, wherein a water unsoluble solvent such as cyclohexane is added to the prehydrolyzed mother solution before undertaking the dispersion stage (b).

18. The method of claim 7, wherein the dried beads are subjected to an alkaline attack to amplify porosity.

19. The method of claim 7, wherein after drying the beads are subjected to heating between 400° and 1200° C. under air to achieve consolidation.

20. A method for the separation of substances dissolved homogeneously in a solution consisting in passing this solution over a column filled with the beads according to claim 1 and successively eluting the components adsorbed on the beads with solvents of progressively changing polarity.

21. A method for immobilizing enzymes on the beads of claim 1, comprising activating the beads surface with a compound bearing a ligand for binding enzymes, such as an alkoxysilane carrying functions like OH, SH, $NH_2$, NCO oxirane and others, contacting the activated beads with selected enzyme preparations and isolating said beads after binding of the enzymes to the beads is effective.

* * * * *